Patented Mar. 6, 1945

2,370,779

UNITED STATES PATENT OFFICE 2,370,779

PREPARATION OF 2-METHYL-4-KETO-1,3-DIOXOLANE

Rollin Francis Conaway, Wilmington, Del., assignor to E. I. du Pont de Nemours & Company, Wilmington, Del., a corporation of Delaware No Drawing. Application October 30, 1942,
Serial No. 463,936

2 Claims. (Cl. 260—338)

This invention relates to 2-methyl-4-keto-1,3-dioxolane and its preparation.

This invention has as an object the provision of a process for making 2-methyl-4-keto-1,3-dioxolane. Another object is the provision of a new solvent and plasticizer for polymeric materials, e. g., polyvinyl acetals, polymers, including interpolymers, of acrylic and methacrylic esters, polymers, including interpolymers, of vinyl chloride, cellulose esters and ethers, etc. Other objects will appear hereinafter.

These objects are accomplished by the following invention wherein acetylene is reacted with hydroxyacetic acid at 0–50° C. in an anhydrous dialkyl ketone of not more than five carbons, e. g., acetone, in the presence of a mercuric sulfate lower fatty acid anhydride catalyst preferably prepared from mercuric sulfate, mercuric oxide, sulfuric acid, and acetic anhydride.

The cyclic acetal of hydroxyacetic acid, 2-methyl-4-keto-1,3-dioxolane,

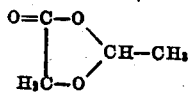

is readily prepared by a method which consists essentially in bringing acetylene in contact with an ahydrous solution of hydroxyacetic acid in a solvent belonging to the group exemplified by acetone and methanol, and in the presence of a suitable catalyst. This process is carried out under pressures of 1–20 atmospheres at 0–50° C. in the presence of a catalyst prepared by mixing mercuric sulfate, mercuric oxide, and a molar excess, based on the mercuric oxide, of sulfuric acid and acetic anhydride. After the reaction mixture has absorbed the theoretical amount of acetylene, it is separated from the catalyst, dried, and the product is isolated by fractional distillation at atmospheric pressure. Other fatty acid anhydrides of up to four carbon atoms, i. e., propionic and the butyric anhydrides can be used in place of the acetic anhydride.

The more detailed practice of the invention is illustrated by the following examples, wherein parts given are by weight. There are, of course, many forms of the invention other than these specific embodiments.

Example I

A mixture of 60 parts of hydroxyacetic acid, 90 parts of dry acetone, 10 parts of mercuric sulfate, 10 parts of mercuric oxide, and 20 parts of anhydrous sodium sulfate (as a dehydrating agent) is placed in a pressure bomb which can be agitated and can be charged with acetylene under pressure. To this is then added a cooled solution of 5 parts of sulfuric acid in 10 parts of acetic anhydride. The apparatus is then flushed with nitrogen, finally pressured with acetylene at 5 pounds gauge pressure, then agitated for 20 hours at 30–35° C. In this manner 23 parts of acetylene is absorbed. To the reaction mixture is then added 14 parts of sodium acetate, and the mixture is filtered, diluted with 200 parts of water, and extracted three times with 300 parts of diethyl ether. The ether extract is dried over anhydrous sodium sulfate, and the ether and acetone are removed by distillation at atmospheric pressure. By distillation of the residue at 3 mm., 2-methyl-4-keto-1,3-dioxolane is collected as the fraction boiling at 38–43° C. This crude product is then fractionally distilled at atmospheric pressure to obtain 2-methyl-4-keto-1,3-dioxolane boiling at 142–152° C. In this manner 31 parts of 2-methyl-4-keto-1,3-dioxolane is obtained. A purified sample distills at 148–150° C./757 mm. and has a specific gravity of 1.103 at 25° C.

Example II

To a vessel equipped with a gas inlet tube extending below the surface of the liquid, a gas exit tube, a thermometer, and stirrer is placed a mixture of 100 parts of hydroxyacetic acid, 300 parts of acetone, 15 parts of mercuric sulfate, and 15 parts of mercuric oxide. To this is then added slowly with cooling a chilled solution of 5 parts of sulfuric acid in 10 parts of acetic anhydride. While the temperature is maintained at 30–40° C., acetylene is passed through the mixture at the rate of 5 parts per hour for 14 hours. At the end of this time, 20 parts of sodium acetate, and 200 parts of distilled water is added to the reaction mixture which is then filtered, and extracted three times with 200 parts of diethyl ether. The organic solution is dried over anhydrous sodium sulfate and the ether and acetone are removed by distillation at atmospheric pressure. The residue is then distilled at 3 mm., and the distillate is refractionated at atmospheric pressure in the same manner as described in Example I. Fifty parts of 2-methyl-4-keto-1,3-dioxolane is obtained, distilling at 145–152° C./atmospheric pressure.

In place of the acetone of the examples there may be used, as a solvent for the reaction, any dialkyl ketone of up to five carbon atoms, e. g., methyl isopropyl ketone, methyl ethyl ketone, and acetone. Alcohols such as methanol do not give such desirable results.

An important feature of the catalytic mixture of the present invention is the presence therein of acetic anhydride, or other fatty acid anhydride of four to eight carbon atoms. While an adequate catalyst can be prepared by mixing mercuric sulfate with sulfuric acid and acetic anhydride, the preferred catalyst is one prepared by mixing mercuric sulfate with mercuric oxide and a molar excess, based on the mercuric oxide, of sulfuric acid and acetic anhydride. A "molar excess" is an excess over one mol of sulfuric acid or acetic anhydride per mol of mercuric oxide. Mercuric sulfate can be replaced by mercuric acetate or mercuric phosphate.

2-methyl-4-keto-1,3-dioxolane is useful as a solvent and plasticizer. It is also useful in the modification of hydroxyl-containing polymers such as cellulose and polyvinyl alcohol. It may be polymerized by treating with traces of mineral acids such as sulfuric or hydrochloric acid, and boron trifluoride at temperatures ranging from 20–100° C.

The above description and examples are intended to be illustrative only. Any modification of or variation therefrom which conforms to the spirit of the invention is intended to be included within the scope of the claims.

What is claimed is:

1. Process for preparing 2-methyl-4-keto-1,3-dioxolane which comprises bringing acetylene in contact, at 0–50° C., with hydroxyacetic acid in an anhydrous medium comprising a catalyst prepared from mercuric sulfate, mercuric oxide and a molar excess, based on the mercuric oxide, of sulfuric acid and acetic anhydride.

2. Process for preparing 2-methyl-4-keto-1,3-dioxolane which comprises bringing acetylene in contact, at 0–50° C., with hydroxyacetic acid in an anhydrous medium comprising mercuric sulfate, sulfuric acid, and acetic anhydride.

ROLLIN FRANCIS CONAWAY.